United States Patent
Kleinhoffer et al.

(10) Patent No.: US 9,902,245 B2
(45) Date of Patent: Feb. 27, 2018

(54) VEHICLE SUNROOF ASSEMBLY

(71) Applicants: Richard M Kleinhoffer, Romeo, MI (US); Andrew F Stafford, Rochester Hills, MI (US)

(72) Inventors: Richard M Kleinhoffer, Romeo, MI (US); Andrew F Stafford, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/202,106

(22) Filed: Jul. 5, 2016

(65) Prior Publication Data
US 2018/0009297 A1 Jan. 11, 2018

(51) Int. Cl.
 B60J 7/19 (2006.01)
 B60J 7/02 (2006.01)

(52) U.S. Cl.
 CPC .................. B60J 7/192 (2013.01); B60J 7/02 (2013.01)

(58) Field of Classification Search
 CPC .................. B60J 7/19; B60J 7/192
 USPC .............. 296/213, 216.06–216.09, 218, 221
 See application file for complete search history.

(56) References Cited

U.S. PATENT DOCUMENTS

| | | | | |
|---|---|---|---|---|
| 3,955,848 A | * | 5/1976 | Lutz | B60J 7/1642 16/268 |
| 4,126,352 A | * | 11/1978 | Vogel | B60J 7/1642 296/218 |
| 4,364,600 A | | 12/1982 | Hauber | |
| 5,090,767 A | | 2/1992 | Schreiter et al. | |
| 5,775,769 A | * | 7/1998 | Reihl | B60J 7/05 296/216.03 |
| 5,951,100 A | * | 9/1999 | Ewing | B60J 7/047 296/214 |
| 5,961,177 A | * | 10/1999 | Caye | B60J 7/0038 296/213 |
| 6,030,031 A | * | 2/2000 | Martinus Lenkens | B60J 7/0046 296/217 |
| 6,073,994 A | * | 6/2000 | Jardin | B60J 7/05 296/213 |
| 6,332,645 B1 | * | 12/2001 | Schwarz | B60J 10/25 296/213 |
| 8,177,294 B2 | * | 5/2012 | Bergmiller | B60J 7/192 296/216.06 |
| 8,581,719 B2 | | 11/2013 | Kuo et al. | |

* cited by examiner

*Primary Examiner* — Dennis H Pedder
(74) *Attorney, Agent, or Firm* — Ralph E Smith

(57) ABSTRACT

A vehicle includes a roof panel assembly and a sunroof glass panel. The roof panel assembly defines an opening. The sunroof glass panel has an arm extending from a side thereof. The sunroof glass panel is configured to cover the opening in the roof panel assembly and operable between a closed position, an open position, and a tilted position. The arm extends outwardly past a periphery of the opening in the roof panel assembly. The arm is configured to engage the roof panel assembly to restrict movement of the sunroof glass panel relative to the roof panel assembly.

11 Claims, 4 Drawing Sheets

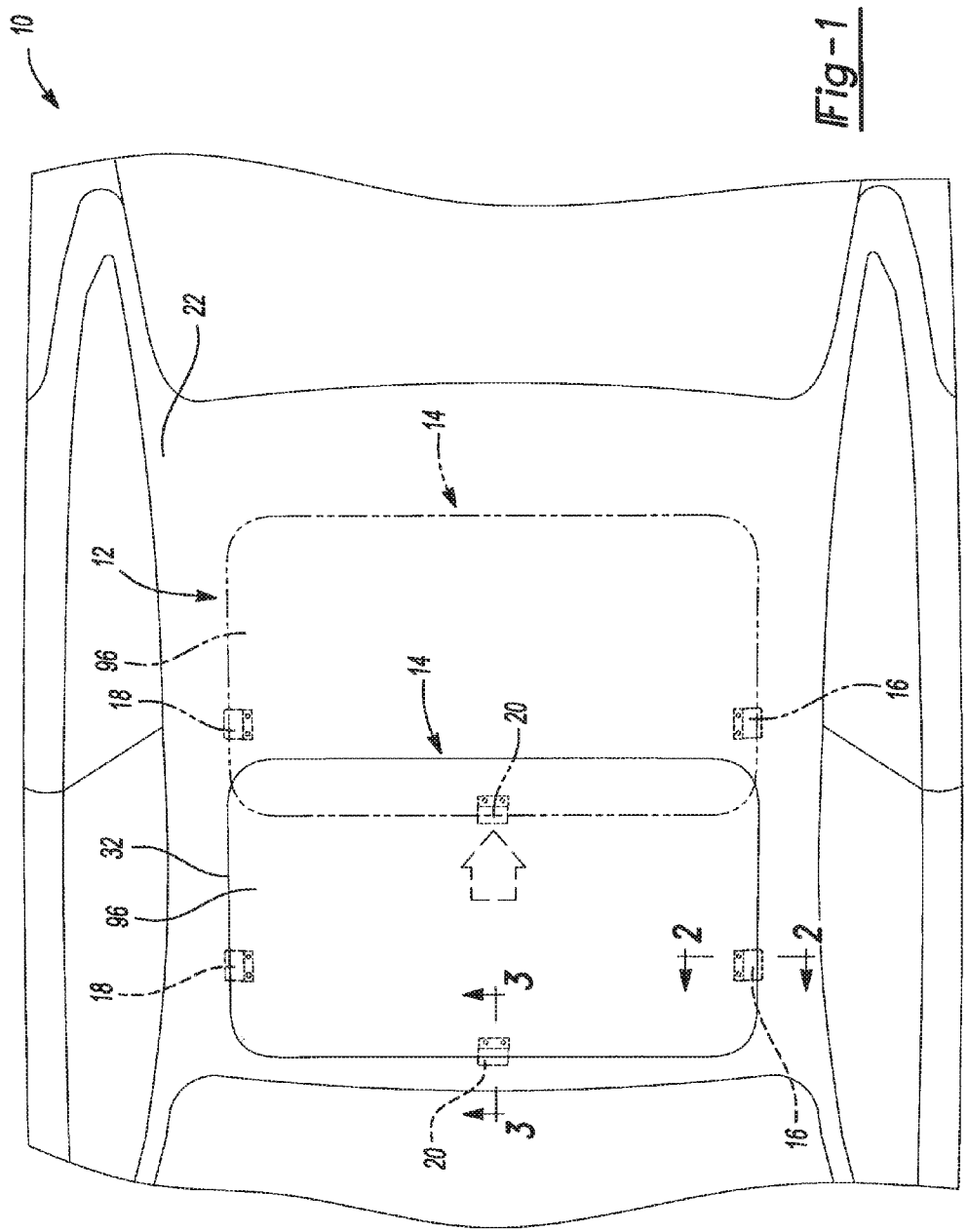

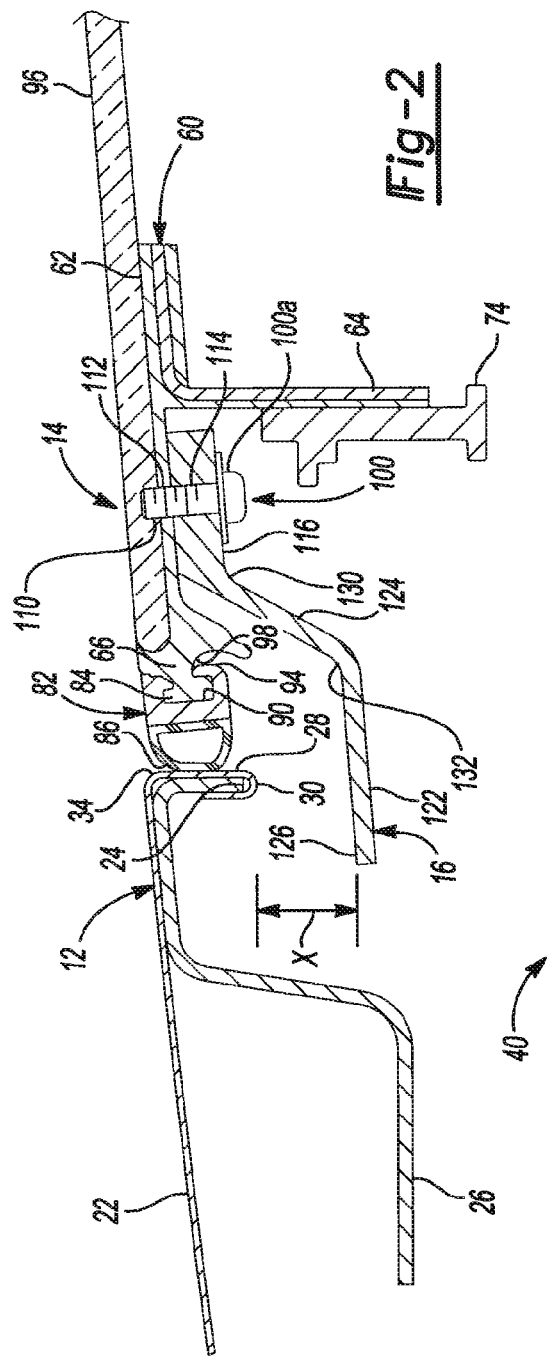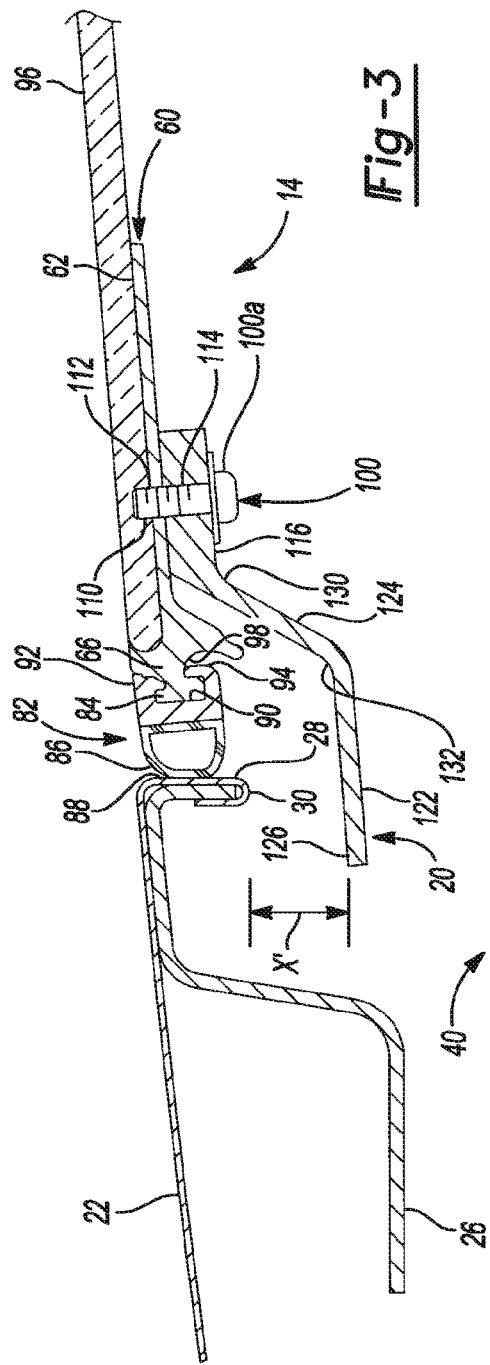

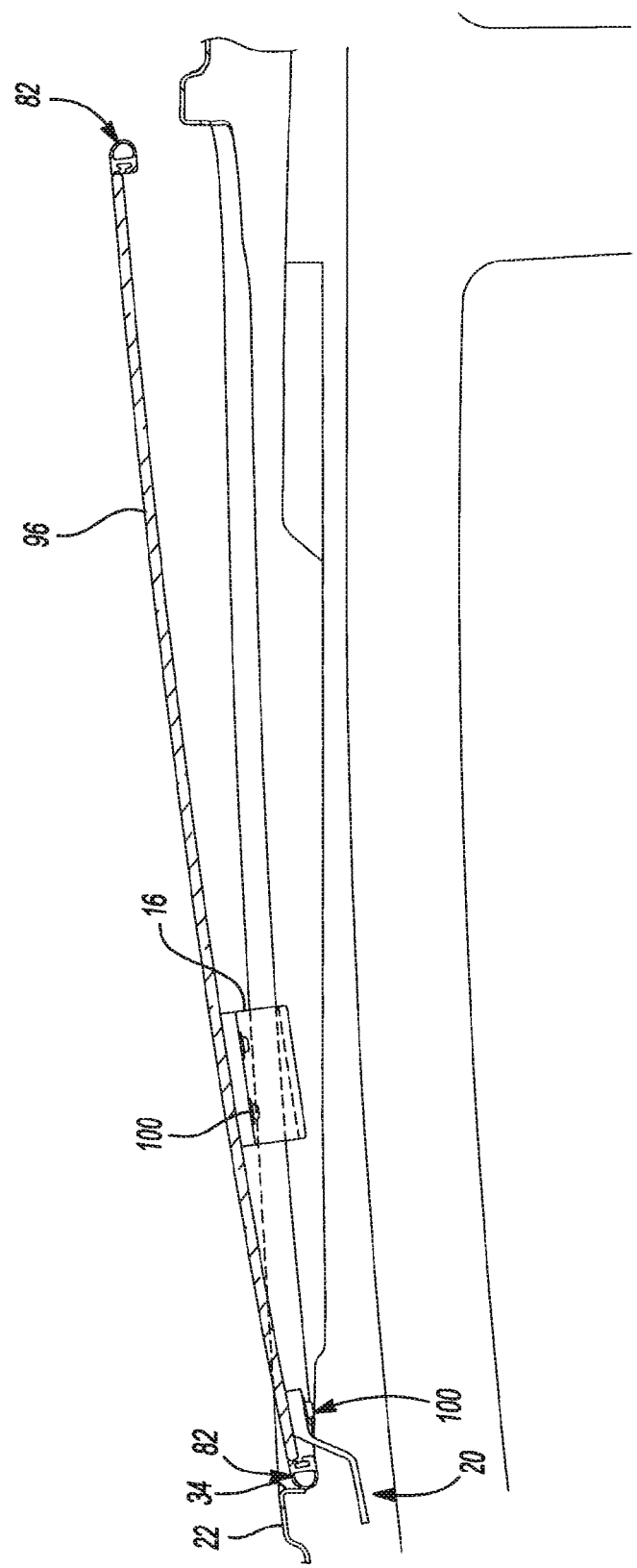

VEHICLE SUNROOF ASSEMBLY

FIELD

The present disclosure relates to a vehicle sunroof assembly.

BACKGROUND

This section provides background information related to the present disclosure and is not necessarily prior art.

Many conventional automotive vehicles include a glass panel (e.g., a sunroof panel) in a roof of the vehicle to enhance the vehicle occupants' enjoyment of the vehicle. The glass panels are often movable relative to the roof to allow airflow into the interior of the vehicle. In one type of typical sunroof assembly that includes the glass panel, the sunroof assembly covers a generally rectangular opening in a roof panel assembly of a vehicle. The sunroof assembly is movable relative to the roof panel assembly between a closed position, an open position and a tilted position.

In some cases, a device or mechanism has been provided to aid in preventing detachment of a movable roof assembly. For example, as described in the Abstract of U.S. Pat. No. 5,090,767, a sliding roof and/or sliding and tilting roof for motor vehicles has a safety device that prevents detachment from the motor vehicle of the moveable cover. The safety device has at least one flexible safety element which is connected to the cover and at least indirectly to a part which is integral with the body of the motor vehicle. The flexible safety element can be a catch band or catch cloth.

SUMMARY

This section provides a general summary of the disclosure, and is not a comprehensive disclosure of its full scope or all of its features.

In one form, the present disclosure provides a vehicle having a roof panel assembly and a sunroof glass panel. The roof panel assembly defines an opening. The sunroof glass panel includes an arm extending from a side thereof. The sunroof glass panel is configured to cover the opening in the roof panel assembly and operable between a closed position, an open position, and a tilted position. The arm extends outwardly past a periphery of the opening in the roof panel assembly. The arm is configured to engage the roof panel assembly to restrict movement of the sunroof glass panel relative to the roof panel assembly.

In some configurations, the arm is configured to engage the roof panel assembly when the sunroof glass panel is in the tilted and closed positions.

In some configurations, the sunroof glass panel further comprises a support member receiving the sunroof glass panel and a seal member attached to the support member at a connection end and engaging the roof panel assembly at a sealing end.

In some configurations, the sunroof glass panel includes another arm extending therefrom and outward past the periphery of the opening in the roof panel and also configured to engage the roof panel assembly to restrict movement of the sunroof glass panel relative to the roof assembly panel. The arms extend from the sunroof glass panel in opposite directions.

In some configurations, the arms that extend from the sunroof glass panel in opposite directions are lateral arms, and the sunroof glass panel further including a front arm that extends outwardly from the sunroof glass panel past a periphery of the opening in the roof panel assembly. The front arm is also configured to engage the roof panel assembly to restrict movement of the sunroof glass panel relative to the roof panel assembly.

In some configurations, the lateral arms are parallel to each other and perpendicular to the front arm.

In some configurations, each arm includes a mounting portion attached to the support member of the sunroof glass panel by a fastener and an engagement portion extending past the periphery of the opening.

In some configurations, the thickness of the mounting portion is greater than the thickness of the engagement portion.

In some configurations, each arm extends below a portion of the roof panel assembly.

In some configurations, the engagement portion of each arm is configured to engage the roof panel assembly to restrict vertical movement of the sunroof glass panel relative to the roof panel assembly.

In some configurations, the sunroof glass panel is vertically displaced above the roof panel assembly when the engagement portion of each arm engages the roof panel assembly.

In some configurations, the side that the arm is attached is a front of the sunroof glass panel and wherein the arm further includes a mounting portion attached to the support member of the sunroof glass panel by a fastener and an engagement portion extending past the periphery of the opening.

In some configurations, the engagement portion of the arm is configured to engage the roof panel assembly to restrict movement of the sunroof glass panel relative to the roof panel assembly.

In some configurations, the sunroof glass panel is vertically displaced above the roof panel assembly when the engagement portion of the arm engages the roof panel assembly.

In some configurations, the arm extends below a portion of the roof panel assembly.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1 is a top view of a vehicle sunroof assembly having a sunroof glass panel and arms according to the principles of the present disclosure;

FIG. 2 is a cross-sectional view of the vehicle sunroof assembly taken along line 2-2 of FIG. 1;

FIG. 3 is a cross-sectional view of the vehicle sunroof assembly taken along line 3-3 of FIG. 1;

FIG. 6 is a side view of the vehicle sunroof assembly with the sunroof glass panel in a tilted position.

Corresponding reference numerals indicate corresponding parts throughout the several views of the drawings.

DETAILED DESCRIPTION

Figure 4:
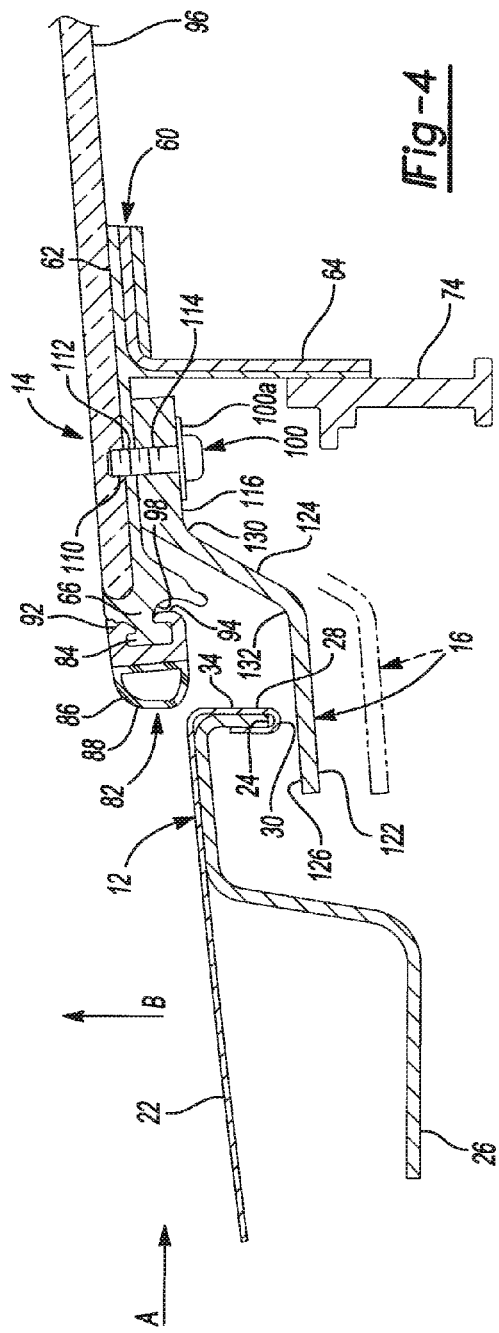
FIG. 4 is a cross-sectional view of the vehicle sunroof assembly taken along line 2-2 of FIG. 1 with the vehicle assembly experiencing a load.

Example embodiments will now be described more fully with reference to the accompanying drawings.

FIG. 1 depicts a vehicle 10 having a roof panel assembly 12 defining an opening 32. The opening 32 has a generally rectangular shape and provides access to a cabin 40 (FIGS. 2-5) of the vehicle 10. A sunroof (or moon roof) assembly 14 is configured to cover the opening 32 in the roof panel assembly 12. The sunroof assembly 14 is movable relative to the roof panel assembly 12 between a closed position (shown in solid lines in FIG. 1) in which the sunroof assembly 14 closes and seals the opening 32, an open position (shown in phantom lines in FIG. 1) in which the opening 32 is exposed to allow air to flow therethrough, and a titled position (FIG. 6) in which the unsealed side of the sunroof assembly 14 allows air to flow therethrough the opening 32 in the roof panel assembly 12 into the cabin 40 of the vehicle 10. As shown in FIG. 1, a plurality of lateral arms 16, 18 and a front arm 20 are removably attached to the sunroof assembly 14 at various positions thereon. As will be described in more detail below, the arms 16, 18, 20 attached to the sunroof assembly 14 engage the roof panel assembly 12 to restrict or prevent separation of the sunroof assembly 14 from the roof panel assembly 12 of the vehicle 10.

As shown in FIGS. 1 and 2, the roof panel assembly 12 includes a panel 22, an engagement flange 34, and a reinforcement flange 26. The panel 22 provides cover for the cabin 40 of the vehicle 10 and also define the opening 32. That is, the opening 32 extends through the panel 22 to allow light and/or airflow into the cabin 40. The engagement flange 34 extends 360 degrees around a periphery of the opening 32 in the roof panel 22. The engagement flange 34 also extends perpendicular from the roof panel 22 to form a generally U-shape having a recess 24. The recess 24 of the engagement flange 34 receives a portion of the reinforcement flange 26. The reinforcement flange 26 abuts against the panel 22 and form a generally S-shape when the portion of the reinforcement flange 26 is received in the recess 24 of the engagement flange 34. A side 28 of the engagement flange 34 sealingly engages the sunroof assembly 14 when the sunroof assembly 14 is in a closed position (as shown in FIG. 2). Interference between the arms 16, 18, 20 and an edge 30 of the engagement flange 34 restricts a range of movement of the sunroof assembly 14 relative to the roof panel 22.

As shown in FIGS. 2 and 3, the sunroof assembly 14 covers the opening 32 formed in the panel 22. The sunroof assembly 14 includes a sunroof glass panel 96, a support member 60 and a seal 82. The sunroof glass panel 96 includes apertures 110 at or near a periphery of the sunroof glass panel 96. The sunroof glass panel 96 is attached to the support member 60, so that the sunroof glass panel 96 is co-planar with the roof panel 22 and seals off the opening 32 when the sunroof glass panel 96 is in the closed position. The seal 82 has a generally hemispherical shape with a tip 88 at an end 86. The tip 88 of the seal 82 is compressed against the side 28 of the engagement flange 34 when the sunroof glass panel 96 is in the closed position. Seal arms 92, 94 and a wall 90 define an opening 98 to a cavity 84 of the seal 82 that connects with the support member 60.

As shown in FIGS. 2-5, the support member 60 includes at least one aperture 112 extending therethrough and axially aligned with the at least one aperture 110 of the sunroof glass panel 96. The support member 60 extends perpendicular to the engagement flange 34 of the roof panel assembly 12. The support member 60 includes a recess 62, a bracket 64, and a connector end 66. An edge of the sunroof glass panel 96 is received in the recess 62 of the support member 60. The connector end 66 is received in the cavity 84 of the seal 82, and the seal arms 92, 94 retain the connector end 66 in the cavity 84. In this way, the seal 82 is securely attached to the support member 60. The bracket 64 is mounted on the support member 60. The bracket 64 is generally L-shaped and extends perpendicular from the support member 60. The bracket 64 is also mounted to a motor bracket 74, which is drivingly connected to a motor (not shown). The motor moves the sunroof glass panel 96 between the open position, the closed position, and the tilted position.

Each arm 16, 18, 20 is attached to the support member 60 of the sunroof assembly 14 by a plurality of fasteners 100. The lateral arms 16, 18 are positioned opposite each other (i.e., at opposing lateral edges of the sunroof glass panel 96) and extend laterally outward from the sunroof glass panel 96 in opposite directions (i.e., toward respective sides of the vehicle 10). The front arm 20 extends from a front edge of the sunroof glass panel 96 (i.e., an edge of the sunroof glass panel 96 closest to the front of the vehicle 10) and extends from the sunroof glass panel 96 toward the front end of the vehicle 10. Each arm 16, 18, 20 includes a mounting member 116, an engagement member 122, and a descending member 124. The descending member 124 is attached on either end to the mounting member 116 and the engagement member 122. The engagement member 122 extends below at least a portion of the roof panel assembly 12.

The descending member 124 is angled downward toward the cabin 40 of the vehicle 10 away from the mounting member 116 and support member 60. The descending member 124 is attached to the engagement member 122 before reaching the engagement flange 34 of the roof panel assembly 12. The descending member 124 also forms obtuse angles with both the mounting and engagement members 116, 122 at connection ends 130, 132, respectively. As shown in FIGS. 2 and 3, the descending member 124 of arms 16, 18 define a distance X between the engagement member 122 and the engagement flange 34 while the descending member 124 of the arm 20 define a distance X' between the engagement member 122 and the engagement flange 34. It should be understood that the distances X, X' can be different from each other or identical to each other.

The mounting member 116 extends parallel to the support member 60 and the sunroof glass panel 96, and perpendicularly to the engagement flange 34 of the roof panel assembly 12. The mounting member 116 includes at least one aperture 114 extending therethrough and axially aligned with the at least one of the apertures 110, 112 of the sunroof glass panel 96 and the supporting member 60, respectively. Each fastener 100 extends through a corresponding set of the apertures 110, 112, 114 in the sunroof glass panel 96, supporting member 60 and the mounting member 116, respectively. The fasteners 100 include a head 100a with grooves (not shown) so as to allow a user (not shown) to threadably secure the fasteners 100 (with an screwdriver for example) in the apertures 110, 112, 114 of the sunroof glass panel 96, supporting member 60 and the mounting member 116, respectively. This way, the mounting member 116 of each arm 16, 18, 20 is securely fastened to the sunroof assembly 14. The user (not shown) is also able to manually remove the mounting members 116 from the sunroof assembly 14 by removing the fasteners 100 from the apertures 110, 112, 114. This allows for the user (not shown) to provide service to the sunroof assembly 14, for example.

The engagement member 122 of each arm 16, 18, 20 extends parallel to the support member 60 and the sunroof glass panel 96, and perpendicularly to the engagement flange 34. The engagement member 122 also extends away from the mounting and descending members 116, 124 outwardly past the engagement flange 34 of the roof panel assembly 12. The engagement member 122 of the arms 16,18 is positioned vertically the distance X from the engagement flange 34 as defined by the descending member 124 while the engagement member 122 of the arm 20 is positioned vertically the distance X' from the engagement flange 34 as defined by the descending member 124. The engagement member 122 of each arm 16, 18, 20 includes a contact surface 126 configured to contact the edge 30 of the engagement flange 34 when the sunroof assembly 14 attempts to separate from the roof panel assembly 12, thereby, impeding the sunroof assembly 14 from lifting out of the opening 32 and separating away from the roof panel assembly 12.

Figure 5:
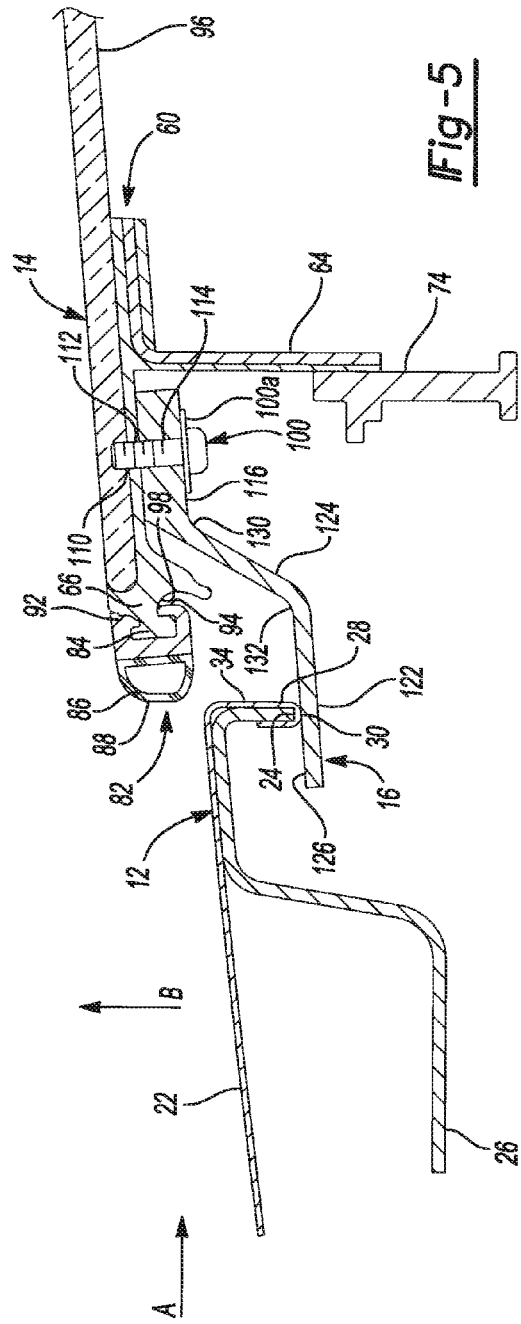
FIG. 5 is a cross-sectional view of the vehicle sunroof assembly taken along line 2-2 of FIG. 1 with the arm of the sunroof glass panel engaging a roof panel assembly.

With continued reference to FIGS. 1-6, operation of the vehicle sunroof assembly 14 will be described in detail. During normal operation of the vehicle 10, the engagement members 122 of the arms 16, 18, 20 are disposed the distance X from the edge 30 of the roof panel assembly 12. If the vehicle 10 experiences an impact event (e.g., a head-on collision), the roof panel 22 may buckle under Load A (FIGS. 4 and 5), which can cause the sunroof glass panel 96 to begin to lift upward out of the opening 32 (as shown in FIGS. 4 and 5). That is, while the roof panel 22 buckles, the sunroof glass panel 96 displaces vertically upward relative to the roof panel 22. Once the sunroof glass panel 96 moves the distance X upward relative to the roof panel 22, the contact surface 126 of the engagement member 122 contacts the engagement flange 34 (FIG. 5). This contact impedes further displacement of the sunroof glass panel 96 and prevents the sunroof glass panel 96 from separating away from the roof panel 22 of the vehicle 10.

In addition to retaining the sunroof glass panel 96 relative to the roof panel assembly 12 during an impact event, one or more of the arms 16, 18, 20 prevent upward movement of the sunroof glass panel 96 relative to the roof panel assembly 12 while the vehicle 10 is moving at high speed. That is, when the vehicle 10 is traveling at high speed, high-velocity air flowing over the roof panel assembly 12 may tend to pull the sunroof glass panel 96 upward relative to the roof panel assembly 12 in direction B (FIGS. 4 and 5). In the same or a similar manner as described above, interference between the engagement member 122 of one or more of the arms 16, 18, 20 restricts or prevents upward movement of the sunroof glass panel 96 relative to the roof panel assembly 12.

It will be appreciated that the distances X, X' can be designed to be any suitable distances depending on the shape and configuration of the roof panel assembly 12 and the amount of upward displacement of the sunroof glass panel 96 that is acceptable for a given application. It should also be appreciated that when the motor (not shown) places the sunroof glass panel 96 in the open or tilted positions, the engagement members 122 of the arms 16, 18 operate similarly as when the sunroof glass panel 96 is in the closed position, thereby, allowing the contact surfaces 126 of the engagement members 122 to contact the edge 30 of the engagement flange 34 and impede the sunroof glass panel 96 from separating away from the roof panel 22 of the vehicle 10.

What is claimed is:

1. A vehicle comprising:
a roof panel assembly defining an opening; and
a sunroof glass panel having an arm extending from a side of the sunroof glass panel; the sunroof glass panel configured to cover the opening in the roof panel assembly and operable between a closed position, an open position, and a tilted position, the arm extending outward past a periphery of the opening in the roof panel assembly,
wherein the arm is spaced apart from the roof panel assembly in the closed, open and tilt positions, and
wherein, when the sunroof glass panel is in the open position, interference between the arm and the roof panel assembly limits vertical movement of the sunroof glass panel relative to the roof panel assembly after the sunroof glass panel has been lifted upward out of the opening in the roof panel assembly in response to an impact event.

2. The vehicle of claim 1, wherein the sunroof glass panel is vertically displaced above the roof panel assembly when the engagement portion of the arm engages the roof panel assembly.

3. The vehicle of claim 1, further comprising a support member receiving the sunroof glass panel, wherein a seal member is attached to the support member at a connection end and engages the roof panel assembly at a sealing end.

4. The vehicle of claim 1, wherein the sunroof glass panel includes another arm extending therefrom and outward past the periphery of the opening in the roof panel, and wherein interference between the another arm and the roof panel assembly limits movement of the sunroof glass panel relative to the roof panel assembly during the impact event.

5. The vehicle of claim 4, wherein the arms extend laterally in opposite direction.

6. The vehicle of claim 5, wherein the lateral arms are parallel to each other and perpendicular to a front arm that extends forward from the sunroof glass panel past the periphery of the opening in the roof panel assembly.

7. The vehicle of claim 4, wherein each arm includes a mounting portion attached to the sunroof glass panel by a fastener and an engagement portion extending past the periphery of the opening.

8. The vehicle of claim 7, wherein the thickness of the mounting portion is greater than the thickness of the engagement portion.

9. The vehicle of claim 8, wherein each arm extends below a portion of the roof panel assembly.

10. The vehicle of claim 9, wherein interference between the engagement portion of each arm and the roof panel assembly limits vertical movement of the sunroof glass panel relative to the roof panel assembly.

11. The vehicle of claim 2, wherein the arm extends below a portion of the roof panel assembly when the engagement portion of the arm engages the roof panel assembly.

* * * * *